Aug. 25, 1953  E. WIEDEMANN  2,650,313
GAS-FILLED ELECTRICAL GENERATOR
Filed June 20, 1952

INVENTOR:-
Eugen Wiedemann
by Pierce, Scheffler & Parker,
ATTORNEYS

Patented Aug. 25, 1953

2,650,313

UNITED STATES PATENT OFFICE 2,650,313

GAS-FILLED ELECTRICAL GENERATOR

Eugen Wiedemann, Baden, Switzerland, assignor to Aktiengesellschaft Brown, Boveri & Cie, Baden, Switzerland Application June 20, 1952, Serial No. 294,530
In Switzerland June 9, 1951

3 Claims. (Cl. 310—57)

With gas-filled electrical machines for high powers, particularly turbo-generators, the cooling gas, for instance hydrogen, is circulated in a closed circuit inside the gas and pressure tight machine casing by means of fans fixed to the rotor of the machine, the gas being cooled in coolers which are located laterally inside the stator casing.

The coolers are very often arranged in recesses inside the casing perpendicular to the longitudinal axis of the machine, two diametrically opposed coolers being provided at each end of the machine. With such cooling systems the gas which is conveyed by the fan at each end of the rotor flows through the air gap between the stator and rotor as well as through radial cooling slots in the stator laminations, whereupon it finally passes back in the opposite direction to the same end of the machine. The flow of cooling gas inside the stator is thus divided and each axial half of the machine is separately cooled. As a result there is no interchange of cooling medium from one end of the machine to the other in the axial direction. This is a disadvantage because if for some reason or other one of the coolers has to be put out of operation temporarily, for instance for cleaning, that half of the machine will then only be cooled with one cooler and there will be a considerable rise in temperature on that side of the machine.

The object of the present invention is to overcome this disadvantage with gas-filled generators provided with coolers arranged in the aforementioned manner. In accordance with the invention this is achieved by means of such an arrangement of cooling channels and separating walls inside the machine casing that cooling gas flowing from one end of the generator through radial slots in the stator towards the centre of the generator is compelled at least partly to pass to the opposite end of the generator.

Figure 1:
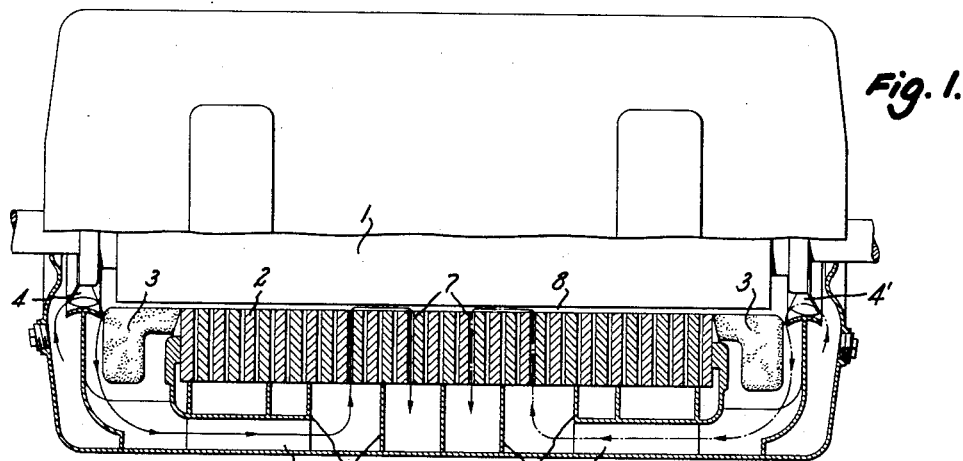
Figure 2:
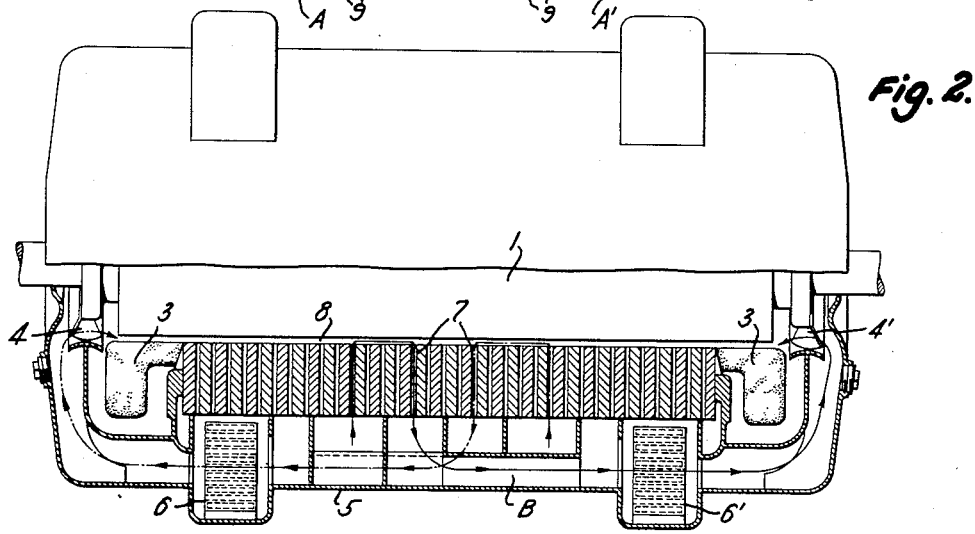
Figure 3:
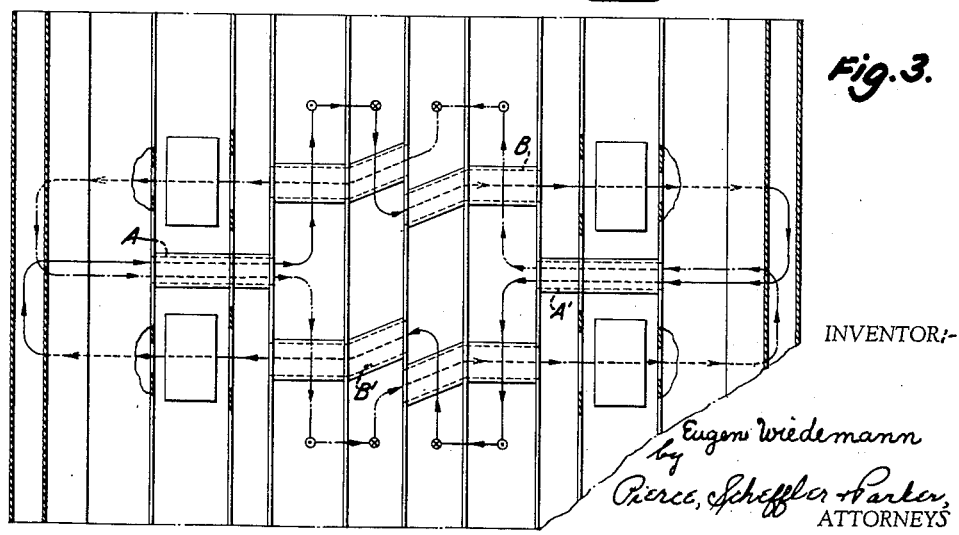

A constructional example of the invention is illustrated schematically in the accompanying drawing where Figs. 1 and 2 show the lower half of a hydrogen-cooled turbo-generator in vertical and horizontal longitudinal section respectively. Fig. 3 shows the development in a plane of the cooling channels and separating walls in the lower part of the machine casing.

In Figs. 1 and 2, reference numeral 1 indicates the rotor, 2 the stator iron, 3 the coil ends and 4, 4' the fans fixed to the ends of the rotor and serving to circulate the cooling gas. At each end of the machine there are two diametrically opposed coolers 6 and 6' respectively which are located vertically in recesses in the machine casing. These coolers serve to cool the cooling gas which circulates in the machine in a closed circuit. Radial cooling slots 7 as well as the air gap 8 between the rotor and the stator serve for cooling the stator iron. Furthermore in order to compel the cooling gas to follow the desired path inside the gas-tight casing, separating walls 9 and axial channels A, A' and B, B' respectively are provided in the space between the stator laminations 2 and the machine casing 5, the effect of these walls and channels being explained below.

Starting from the left end of the machine, the fan 4 produces a movement of the cooling gas through the axial channel A. This axial stream of gas, which is indicated in the drawing by the full lines, is caused by the separating walls 9 to flow radially inwardly through the cooling slots 7 in the stator iron, along the air gap 8 between the stator and the rotor, and then due to a further separating wall in the middle of the machine radially outward again through further stator cooling slots until it finally reaches the axial channel B. From this channel B the cooling gas then flows in the axial direction to the cooler 6' at the opposite end of the machine. The fan 4' at the right end of the machine forces the gas which has been cooled in the cooler 6' to flow in an analogous manner through the machine to the left end. This gas stream which is indicated by the broken lines, first of all passes in the axial direction through the channel A' at the right-hand end, then due to the separating walls 9 radially inwards through cooling slots in the stator iron, along the air gap between the stator and the rotor, and finally radially outwards again through the stator cooling slots into the channel B'. After this the cooling gas passes through cooler 6 to the fan 4 at the left-hand end of the machine.

With the arrangement according to the invention the cooling medium streams are diverted at the centre of the machine so that they cross each other, due to the fact that the cooling medium stream from one end of the machine does not return to the same end as is the case with the cooling systems employed hitherto, but now passes to the opposite end of the machine. For each axial half of the generator there are thus two cooling medium streams which intersect each other and when one of the coolers is out of operation the gas is still adequately cooled by the cooler located at the other end of the machine. The number of intersecting gas streams can be increased by providing additional axial channels of the kind described.

The circuit followed by the cooling medium inside the generator can also be arranged in such a manner that only part of the cooling medium is cooled in the manner described, whilst the remaining part is passed back to the same end of the machine from which it has come, that is in a known manner.

I claim:

1. A gas filled electrical generator comprising a rotor, a stator, a casing enclosing said rotor and stator, a fan adjacent each end of said casing, radial slots in said stator, two gas conduits within said casing each connecting the discharge of a fan with a separate portion of said radial slots, two gas conduits within said casing each connecting the intake of a fan with other separate portions of said radial slots, each of said conduits connecting the discharge of a fan to said slots being connected through said slots and a space between the rotor and stator to one of said conduits connecting said slots with the intake of a fan, and cooling means positioned to cool the gas within said casing.

2. A gas filled electrical generator as defined in claim 1 in which the cooling means comprises coolers positioned in the paths of the gas passing through the conduits leading to the intakes of the fans.

3. A gas filled electrical generator as defined in claim 1 in which the cooling means comprises two diametrically opposed self-contained coolers positioned in recesses in the wall of the casing adjacent each end thereof and extending across the conduits connecting the slots with the intakes of the fans.

EUGEN WIEDEMANN.

References Cited in the file of this patent

UNITED STATES PATENTS

| Number | Name | Date |
|---|---|---|
| 2,285,199 | Freiburghouse | June 2, 1942 |
| 2,372,135 | Sterrett | Mar. 20, 1945 |

FOREIGN PATENTS

| Number | Country | Date |
|---|---|---|
| 276,433 | Great Britain | Aug. 29, 1927 |
| 619,747 | Germany | Oct. 12, 1935 |